United States Patent [19]
Schiller et al.

[11] Patent Number: 5,499,046
[45] Date of Patent: Mar. 12, 1996

[54] CATV DISTRIBUTION SYSTEM WITH EACH CHANNEL HAVING ITS OWN REMOTE SCHEDULER

[75] Inventors: Jay B. Schiller; Richard A. Schmelzer, both of Boulder, Colo.

[73] Assignee: Cable Services Technologies, Inc., Boulder, Colo.

[21] Appl. No.: 247,967

[22] Filed: May 23, 1994

[51] Int. Cl.⁶ .............................. H04N 7/16; H04N 7/173
[52] U.S. Cl. .................................... 348/6; 348/3; 348/12; 455/5.1; 455/6.1
[58] Field of Search .................................. 348/3, 6, 7, 12, 348/13; 455/5.1, 6.1, 4.2; H04N 7/16, 7/173

[56] References Cited

U.S. PATENT DOCUMENTS

| | | | |
|---|---|---|---|
| 4,422,171 | 12/1983 | Wortley et al. | 371/32 |
| 4,763,191 | 8/1988 | Gordon et al. | 348/6 |
| 4,829,372 | 5/1989 | McCalley et al. | 348/6 |
| 4,841,526 | 6/1989 | Wilson et al. | 371/32 |
| 4,888,767 | 12/1989 | Furuya et al. | 370/95.2 |
| 4,908,828 | 3/1990 | Tikalsky | 371/69.1 |
| 4,920,432 | 4/1990 | Eggers et al. | 360/33.1 |
| 4,939,731 | 7/1990 | Reed et al. | 371/32 |
| 5,014,125 | 5/1991 | Pocock et al. | 348/6 |
| 5,151,782 | 9/1992 | Ferraro . | |
| 5,168,353 | 12/1992 | Walker et al. | 398/6 |
| 5,172,413 | 12/1992 | Bradley et al. | 380/20 |
| 5,181,107 | 1/1993 | Rhoades | 455/5.1 |
| 5,191,410 | 3/1993 | McCalley et al. | 348/6 |
| 5,220,420 | 6/1993 | Hoarty et al. | 348/6 |
| 5,245,420 | 9/1993 | Harney et al. | 358/7 |
| 5,247,347 | 9/1993 | Litteral et al. | 348/6 |
| 5,247,575 | 9/1993 | Sprague et al. . | |
| 5,253,275 | 10/1993 | Yurt et al. | 375/122 |
| 5,262,875 | 11/1993 | Mincer et al. . | |
| 5,283,639 | 2/1994 | Esch et al. . | |
| 5,285,272 | 2/1994 | Bradley et al. | 348/6 |
| 5,301,194 | 4/1994 | Seta | 370/95.1 |
| 5,311,423 | 5/1994 | Clark | 455/3.1 |
| 5,367,330 | 11/1994 | Haave et al. | 455/5.1 |

Primary Examiner—Victor R. Kostak
Assistant Examiner—Glenton B. Burgess
Attorney, Agent, or Firm—Myers, Liniak & Berenato

[57] ABSTRACT

A cable television (CATV) system including a plurality of headends, each headend outputting different video/audio programs to subscribers by way of a plurality of channels. The playlist or scheduling data corresponding to each channel is generated and modified by a separate and distinct scheduling computer, the scheduling computers for each channel being located at different locations. Such a system allows the output of each CATV channel at different headends to be generated, modified, and controlled via separate schedulers. This is advantageous in environments where different companies control the distribution of different channels. For example, company A, which outputs its programs via channel 1 may control the channel 1 playlist from its headquarters, while company B which outputs its programs via channel 3 may control channel 3 scheduling from its headquarters, the headquarters of companies A and B of course being remote from one another thereby enabling companies A and B to control their respective channel presentation from locations of their choice.

11 Claims, 5 Drawing Sheets

CATV DISTRIBUTION SYSTEM WITH EACH CHANNEL HAVING ITS OWN REMOTE SCHEDULER

RELATED APPLICATION

This application is related to a co-filed and co-owned U.S. patent application Ser. No. 08/247,834 filed May 23, 1994 and entitled "System for Distributing Video/Audio Files from Central Location to a Plurality of Cable Headends".

This invention relates to the scheduling of video/audio programs to be output from a CATV headend. More particularly, this invention relates to a system and method for controlling the playlists or schedules of different cable channels from different locations, the playlist or schedule corresponding to each channel being controlled via different schedulers.

BACKGROUND OF THE INVENTION

Cable television (CATV) systems engage in the broadcasting of video/audio programs to vast numbers of remotely located subscribers. The programs themselves are typically distributed to the subscribers from locations known as cable headends, each headend being able to output different programs by way of a plurality of channels (e.g. channels 1–4).

Programs to be distributed are typically supplied via around-the-clock real time satellite transmissions to respective headends from one or more distribution stations, the headends directing the programs to their respective channels for distribution to subscribers.

CATV systems may include a master scheduler located at either a headend or the distribution station. This master scheduler controls the playlist (i.e. content, order, and timing) of the video/audio programs to be output over the different channels from each headend. Such CATV systems are disclosed in U.S. Pat. Nos. 5,311,423, 5,283,639, and 5,168,353 just to name a few.

In the world of modern cable television, the output of each channel is generally controlled by a particular operator or company. For example, "HBO" may control one particular channel output at different headends, while "Cinemax," "Preview," and "TBS" also control their own particular channels. In other words, "HBO" may control channel 1 output at different headends, while "Cinemax" controls channel 2, "Preview" controls channel 3, and "TBS" controls channel 4. Thus, the programs (i.e. advertisements, performances, sitcoms, sporting events, etc.) output by each channel are in accordance with a playlist or schedule desired and typically put together by the company (e.g. HBO) controlling the particular channel.

Companies such as HBO, for example, repetitively and redundantly broadcast their programs around-the-clock in real time via satellite to CATV headends thus tying up costly satellite time. Such real time satellite transmissions to headends are based on scheduling done at the company. Headends, upon receiving such transmissions, simply direct the HBO programs, for example, to channel 1.

It is apparent from the above that there exists a need in the art for a cable television (CATV) file distribution and scheduling system which will allow the different companies (e.g. HBO, Cinemax, etc.) controlling the output of particular CATV channels to generate, edit, and modify the playlist schedules of their respective channels from locations of their choosing such as the company headquarters, each company being able to communicate such information directly to different CATV headends broadcasting its channel. Furthermore, it would be desirable if such a system would also allow the controller of a particular channel to directly communicate with a video/audio file distribution station and request that it access and transmit to particular cable headends files or programs needed by the particular headends as determined by the playlist schedule generated by the company so as to allow the headends to store such files. The distribution of files for storage at the headend(s) eliminates the prior art problem of redundant or repetitious satellite broadcasting to headends.

It is thus the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a method for controlling the playlist schedules of first and second video/audio channels output from a CATV headend, the method comprising the steps of:

a) generating a playlist schedule for the first channel at a first scheduling location, the first scheduling location including a first computer for generating and modifying the first channel playlist schedule;

b) generating a playlist schedule for the second channel at a second scheduling location, the second scheduling location including a second computer for generating and modifying the second channel playlist schedule thereby allowing the playlist schedules of the first and second channels to be generated, modified, and controlled from different locations;

c) supplying the headend from a first file distribution station digital video/audio files contained in the first and second channel playlists, the first and second computers at the first and second scheduling locations being in communication with the first file distribution station for instructing the distribution station to supply particular files to the headend;

d) outputting from the CATV headend video/audio programs over the first channel to a plurality of subscribers in accordance with the first channel playlist schedule generated in step a); and e) outputting from the CATV headend video/audio programs over the second channel to the plurality of subscribers in accordance with the second channel playlist schedule generated in step b).

This invention further fulfills the above-described needs in the art by providing a cable television system with remote channel scheduling, the system comprising:

a cable headend including a headend server for outputting first and second CATV channels to a plurality of subscribers, the first and second CATV channels carrying different video/audio programs for distribution to the plurality of subscribers and in accordance with pre-determined playlist schedules, wherein each said subscriber has a receiver for allowing the subscriber to choose between one of the first and second channels for view;

a video/audio file distribution station having a transmitter server for transmitting digital video/audio files in non-real time to the cable headend, the cable headend subsequently storing the received files for later distribution to the plurality of subscribers;

first and second scheduling stations for generating the playlist schedules for the first and second channels by way of controlling the content, order, and time that the video/audio programs are output to the subscribers over each of the first and second channels, the first scheduling station for controlling the playlist schedule of the first channel and the second scheduling station for controlling the playlist schedule of the second channel so as to allow the video/audio output of the first and second channels to be controlled separately; and computer means at each of the first and second scheduling stations for modifying the playlist schedules of the first and second channels respectively, the computer means also for accessing the transmitter server at the file distribution station and requesting transmission of files listed on the playlist schedules from the distribution station to the cable headend, whereby the headend is supplied with the files to be output via the first and second channels in accordance with the playlists generated by the first and second scheduling stations.

IN THE DRAWINGS

DETAILED DESCRIPTION OF CERTAIN EMBODIMENTS OF THIS INVENTION

Figure 1:
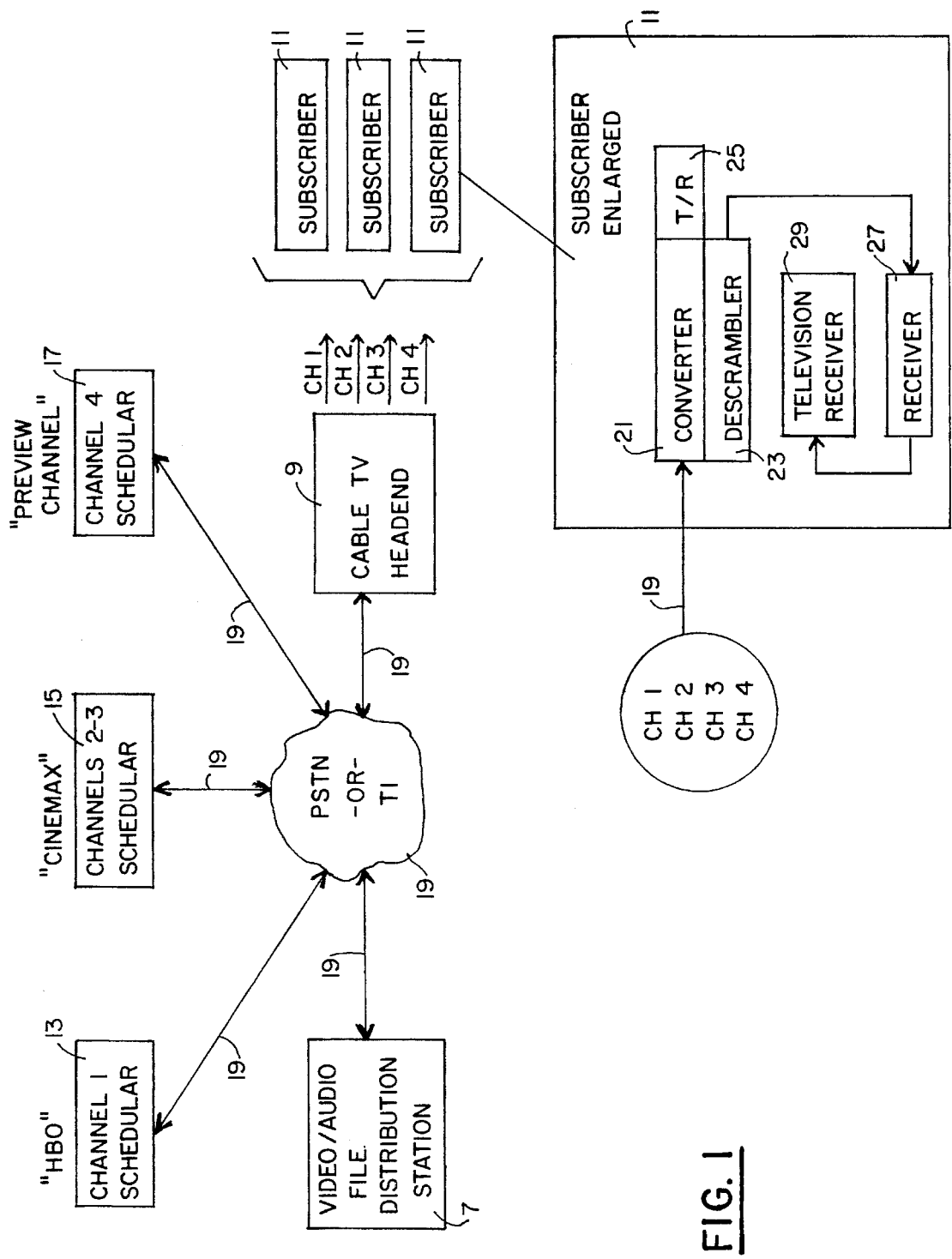
FIG. 1 is a block diagram illustrating a cable television distribution system including remote channel scheduling at different locations according to an embodiment of this invention, this figure illustrating an enlarged subscriber so as to show certain elements thereof.

Referring now more particularly to the accompanying drawings in which like reference numerals indicate like parts.

Figure 2:
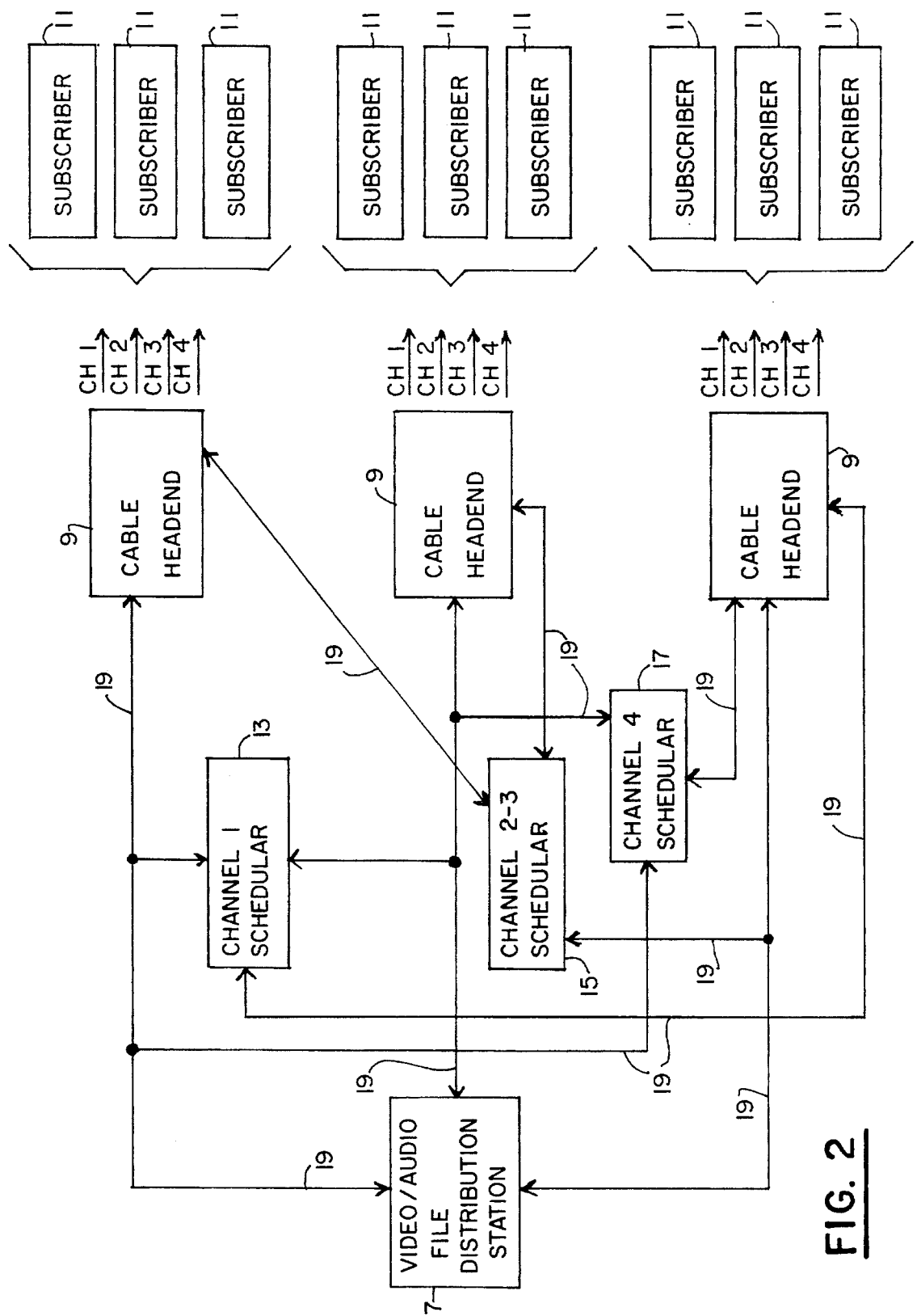
FIG. 2 is a block diagram illustrating the cable television distribution system including a plurality of CATV headends according to the FIG. 1 embodiment of this invention.

FIGS. 1–2 are block diagrams according to an embodiment of this invention depicting a system and method for distributing video/audio files (or programs) to a plurality of subscribers via cable television (CATV). As shown, the system includes video/audio file distribution station 7 and at least one cable television headend 9 for outputting or distributing video/audio programs to subscribers 11 via a plurality of channels (e.g. channels 1–4 as illustrated).

Each channel output from headend(s) 9 has its playlist or scheduling data such as content, order, and timing dictated by a particular scheduler. Channel scheduler 13 controls the scheduling of channel 1 output from headend(s) 9, while channels 2–3 scheduler 15 generates and controls the playlist schedule for channels 2 and 3 output via headend(s) 9, and channel 4 scheduler 17 controls the playlist schedule of channel 4 output from headend(s) 9.

Each scheduler 13, 15, and 17 respectively is disposed at a separate and distinct location in certain embodiments of this invention so as to allow the playlist schedules of the different channels (e.g. channels 1–4) to be controlled from different locations. Thus, the controller (e.g. "HBO") of channel 1 can generate, edit, modify, etc. the playlist and other scheduling data with respect to channel 1 via scheduler 13 which may be located, for example, at its headquarters. In a similar manner, the controller or owner of channels 2–3 output via headend(s) 9 may control, edit, modify, etc. the playlist schedules for channels 2–3 from its headquarters or other desirable location, while the same is true with respect to channel 4 scheduler 17.

For purposes of example herein, let us assume that HBO owns the rights with respect to channel 1 output, Cinemax the rights of channels 2–3, and "Preview Channel" the rights with respect to channel 4. In such a case, scheduler 13 may be provided at a location of HBO's choosing while schedulers 15 and 17 may be disposed at positions desirable to Cinemax and Preview respectively. Thus, if desired, HBO, Cinemax, and Preview may control the scheduling and corresponding outputs of their particular channels via headend(s) 9 from separate locations 13, 15, and 17 respectively. Such a provision of multiple schedulers, each at a different location, overcomes the need for the owner or controller of a particular channel to communicate its scheduling requirements to a central or master scheduler and further eliminates the need for around the clock redundant real time satellite transmission of programs to headends.

Each channel scheduler 13, 15, and 17 includes its own scheduling computer. Thus, an HBO operator at scheduler 13 may utilize the HBO scheduling computer to change the order, timing, or programs to be shown via channel 1 from location 13. The scheduling computer at each scheduler 13, 15, and 17 is a PC driven by a high powered chip such as an Intel 486 or Pentium in certain embodiments of this invention. Examples of such conventional scheduling computers are the Ambra Pentium DP60/PCI, the Ambra Pentium DP60 E/VL, and the Dell 486/66 EISA, all of which are commercially available.

Each of channel schedulers 13, 15, and 17 are in communication with both headend(s) 9 which broadcast their particular channel(s) and distribution station 7 via appropriate communication link(s) 19 in certain embodiments of this invention. Communication link 19 may be, for example, a conventional Public Switched Telephone Network (PSTN), "T1" available from U.S. West, Frame Relay available from Wiltel or Sprint, SMDS available from Bell Atlantic, DS3, ATM, etc. or combinations thereof. For example, files may be transmitted from station 7 to headends 9 via "T1," satellite, or microwave, while all other communications are carried out via PSTN or internet. In other words, communication link(s) 19 is/are conventional in nature and simply need allow scheduling stations 13, 15, and 17 to communicate with both headend(s) 9 and at least one video/audio file distribution station 7.

Schedulers 13, 15, and 17 are in communication with headends 9 outputting their particular channel(s) so as to allow operators or application software at stations 13, 15, and 17 to update headends 9 with respect to new or modified scheduling information corresponding to their respective channels. Furthermore, each of scheduling stations 13, 15, and 17 is in communication with at least one distribution station 7 so as to allow distribution station 7 to transmit files (i.e. video/audio advertisements, movies, etc.) to headends 9 in accordance with the required playlist scheduling data generated at stations 13, 15, and 17 and stored at headends 9. In certain embodiments, each scheduler may communicate with multiple distribution stations. Each of schedulers 13, 15, and 17 also carry out conventional traffic flow and billing functions in certain embodiments of this invention.

For example, if HBO scheduler 13 were to modify its playlist so as to enter a new movie thereinto, the new movie not being in storage at headend(s) 9, then scheduler 13 would communicate via communication link 19 with distribution station 7 and request or instruct that station 7 transmit the new movie to headend(s) 9 in need so that the movie may be stored and subsequently broadcast over channel 1 in accordance with the modified playlist or schedule generated at station 13.

Alternatively, each scheduler may be split so that a computer at one location (e.g. at a headend) performs all scheduling functions while a computer at another location (e.g. HBO headquarters) accesses and instructs distribution stations with respect to when and what files to transmit to headends.

Each of cable headends 9 distributes video/audio files or programs via a plurality of channels. While channel numbers 1–4 are used and illustrated herein for the purpose of example, each headend 9 may output up to one hundred or more channels over the corresponding CATV network. Each headend 9 distributes programs via its plurality of channels to subscribers 11.

One of subscribers 11 is enlarged in FIG. 1 so as to illustrate certain elements thereof. Each subscriber 11 has an addressable converter box 21 which enables downstream access to particular CATV channels. Converter 21 allows and controls the viewing of programing in its respective subscriber premises 11. For the reason that headends 9 include scramblers in certain embodiments of this invention, corresponding subscribers 11 are accordingly provided with descramblers 23. Subscribers 11 with enabled descramblers 23 which unscramble particular programs coming in on certain channels may view intelligible programming, while unenabled descramblers 23 simply allow subscriber 11 to view jumbled data. Converter 21 further includes a receiver or transmitter/receiver section 25 which converts the received signals from the cable network to base band.

When subscriber 11 has a recorder 27 such as a VCR in certain embodiments, the descrambled signal exits descrambler 23 and is forwarded to recorder 27 and from there is processed to television receiver 29. Receiver 29 includes a monitor enabling the subscriber to view the programs distributed by headends 9. While the plurality of channels (e.g. channel numbers 1–4) are output from headends 9 to each subscriber, converter 21 in each subscriber premises permits a particular channel to be chosen for viewing. Thus, a subscriber may select for view, for example, either HBO, Cinemax, or Preview in a conventional manner.

FIG. 2 differs from FIG. 1 in that more than one cable headend 9 is illustrated. Accordingly, if each of the illustrated headends 9 is distributing channels 1–4, channel schedulers 13, 15, and 17 need be in communication with all such headends 9 as well as file distribution station 7 via conventional communication links 19, this being shown in FIG. 2.

Distribution station 7 may be disposed at any of a plurality of locations. Station 7 may be located at, for example, HBO headquarters proximate scheduler 13, at a headend 9, or at a location remote from all headends and schedulers in certain embodiments.

Figure 3:
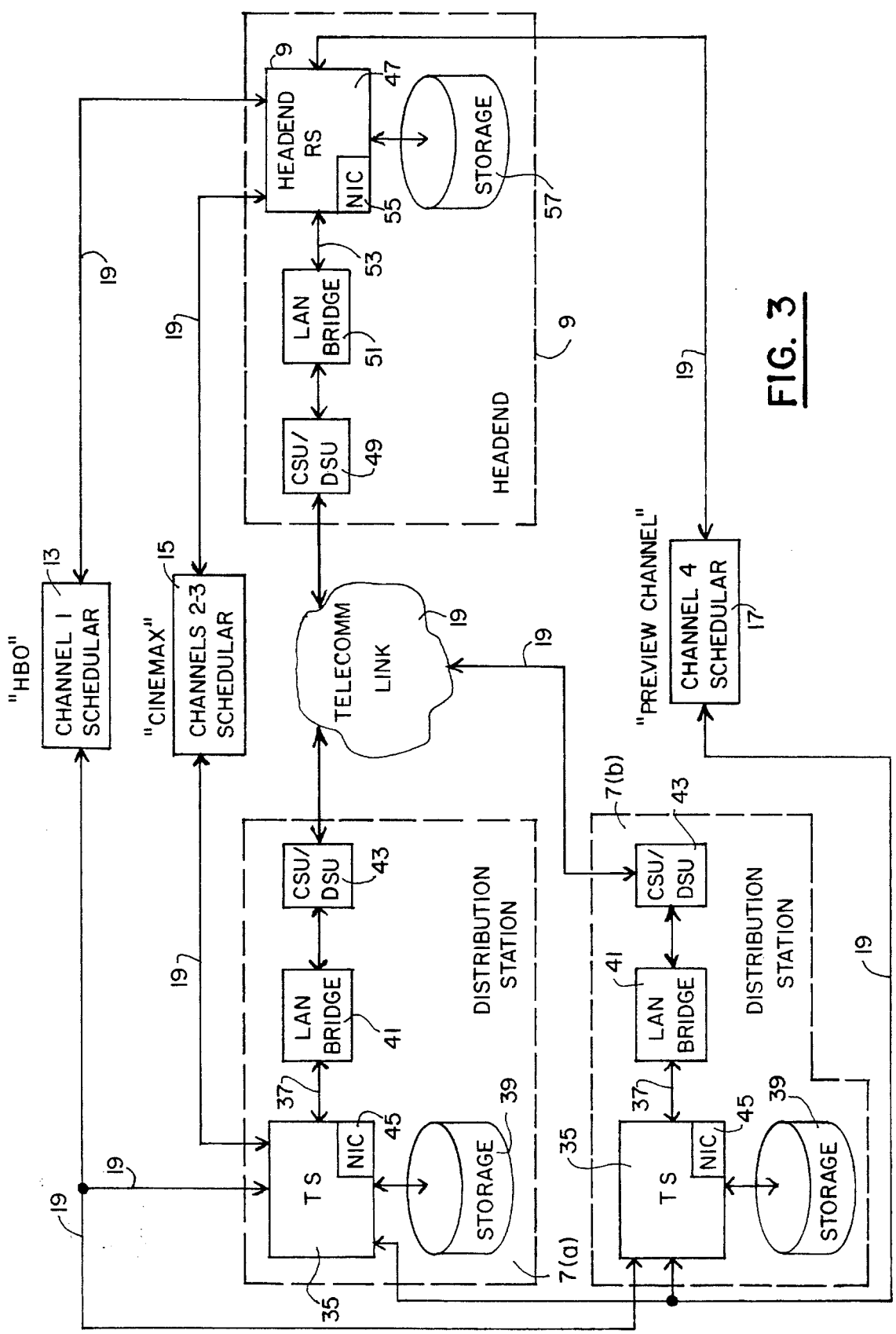
FIG. 3 is a block diagram illustrating a cable television file or program distribution system including channel scheduling at different locations according to another embodiment of this invention, this embodiment including a plurality of transmitter servers and thus a plurality of distribution stations transmitting files to at least one headend.

FIG. 3 is a block diagram illustrating the video/audio file distribution system and method according to another embodiment of this invention. While the embodiment of FIGS. 1–2 included only one distribution station 7, this FIG. 3 embodiment includes two such stations 7(a) and 7(b). As shown, channel 1 scheduler 13 and channels 2–3 scheduler 15 are in communication with distribution station 7(a) and a corresponding headend(s) 9, while channel 4 scheduler 17 is in communication with distribution stations 7(a), 7(b) and headend(s) 9. Additionally, scheduler 13 may communicate with station 7(b). Thus, in accordance with our exemplary uses of HBO, Cinemax, and Preview, scheduler 17 used by Preview may access distribution stations 7(a) and 7(b) while HBO scheduler may also access both distribution stations. This allows these schedulers to forward files from either station 7(a) or 7(b) to desired headend(s) 9. Each scheduler has stored the files present at the various distribution stations which the scheduler is in communication, thus allowing each scheduler to pick and choose distribution stations in accordance with the files stored at each station.

Distribution stations 7(a) and 7(b) in FIG. 3 are enlarged so as to illustrate certain file transfer elements thereof. Each station includes transmitter server (TS) 35, LAN 37, hard drive storage 39 accessible by transmitter server (TS) 35, conventional LAN-bridge 41, and CSU/DSU 43.

Storage 39 at each distribution location 7 is of the hard drive type in certain embodiments of this invention, however, any conventional digital data storage will suffice. Hard drive storage 39 may be an optical disk drive(s), magnetic disk drive(s), etc., such drives being conventional in nature as will be appreciated by those of skill in the art. Micropolis 2217AV and Seagate Barracuda ST/12550W hard drives are two such commercially available examples.

Transmitter server (TS) 35 including Network Interface Card (NIC) 45 affixed thereto is a computer such as a high powered PC which accesses hard drives 39 so as to selectively retrieve desired digital video/audio data files therefrom. TS 35 typically is a computer driven by a high powered chip such as an Intel 486 or Pentium. TS 35 may be, for example, an Ambra Pentium DP60/PCI, an Ambra Pentium DP60 E/VL, or a Dell 486/66 EISA, all of which are commercially available.

When it is desired to transfer a file(s) to headend 9, TS typically 35 receives a copy instruction referencing a particular file(s) from either an operator using a scheduler or one of schedulers 13, 15, and 17 located remote TS 35 in certain embodiments of this invention. An alternative embodiment would be the positioning of a scheduler adjacent or within TS 35. Additionally, an operator at TS 35 or a corresponding scheduler (e.g. 13, 15, or 17) may utilize a keyboard to retrieve and transmit certain files from TS 35, or alternatively, application software may be used.

The aforesaid copy command instructs TS 35 that particular CATV headends are in need of certain video/audio files. Thus, TS 35 knows when and what files to access in hard drive 39. The files accessible by server 35 in storage 39 may be, for example, advertisements, movies, cable television shows, or any other type digital data file which may be distributed by a headend 9.

A digital compression station (see element 47 in FIG. 4) may be linked to TS 35 in certain embodiments of this invention thus enabling server 35 to receive compressed video/audio files for storage in hard drive 39 and later transmission in less than real time to headend(s) 9. For example, if video files are sent from a remote location to TS 35, such files may be compressed at station 47 before reaching TS 35 so as to increase the number of files which may be stored in hard drive 39 and reduce transmission bandwidth. However, data compression is, as will be recognized by those of skill in the art, an optional feature in certain embodiments of this invention. If compression station 47 is to be provided, the files received by TS 35 may be conventionally compressed therein using, for example, MPEG 1 or MPEG 2.

TS 35 via Local Area Network (LAN) 37 communicates with LAN-bridge 41. LAN 37 is a well-known data communication system that provides common access from peripheral such as disk drives, printers, bridges, etc. to computers such as server 35 including a user terminal. TS 35 includes network station software and NIC 45 which allow communication via LAN 37 between server 35 and the other system elements. The LAN cable may be, for example, a coax and/or fiber optic line(s).

Examples of typical commercially available NICs are Standard Microsystems Corporation (SMC) LAN ET16C Elite and N.E.T. ATMX. Any of several Local Area Network (LAN) configurations may be used in the different embodiments of this invention, the choice depending on the environment, size, and requirements of the system. Possible commercially available LANs include ARCnet, ethernet, FDDI, token ring, etc. LAN-bridge 41 may be, for example, LAN B/200 remote ethernet bridge by N.A.T.

Using a conventional file transfer layered protocol such as TCP/IP, TS 35 segments or divides the retrieved video/audio file data into a plurality of data packets, these packets then being routed via LAN 37 and LAN-bridge 41 to CSU/DSU 43. A version of TCP/IP which may be used in certain embodiments of this invention is commercially available from Novell which uses this version for its UnixWare product line.

TCP/IP is discussed and described in the following publications: 1) "Computer Networks," Second Edition by Andrew S. Tanenbaum (1989); 2) "Frames, Packets and Cells in Broad Band Networking," by William A. Flanagan (1991); 3) "Internetworking with TCP/IP," Second Edition, Vol. 1, by Douglas E. Comer; and 4) "TCP/IP Network Administration," by Craig Hunt describing Novell Unix-Ware, the disclosures of all of which are hereby incorporated herein by reference.

The TCP portion of TCP/IP ensures that each packet is given a sequential number so that the packet may be reorganized into proper order by receiver server 47 at headend 9. The TCP portion and/or a LAN protocol also provide error identification data which allows for acknowledgement (positive or negative) with respect to whether received packets are in error. The IP portion of TCP/IP provides Wide Area Network (WAN) addressing functions such as routing and the like, "IP" standing for "Internet Protocol." In other words, IP focuses on communications between hosts on different networks.

When the data packets of a particular file finally reach CSU/DSU 43, they are directed over telecommunication link 19 (e.g. "T1," etc.) to receiving CSU/DSU 49, CSU/DSU 49 being disposed at a headend 9 in certain embodiments of this invention. When CSU/DSUs 43 and 49 are used, link 19 is necessarily a bi-directional "T1" line or lines commercially available from U.S. West. Alternatively, if T1 is not used as link 19, CSU/DSUs 43 and 49 may be replaced with conventional data routers and data service (either dedicated or switched). CSU/DSUs 43 and 49 may be, for example, conventional AdTran TSU T1 DSU/CSU with V0.35 interface in certain embodiments of this invention.

Alternatively, conventional point-to-point microwave Spread Spectrum and/or CDMA may be used to transmit the packets instead of "T1". In such a case, either Frequency Hopping or Direct Sequencing Methods may be used.

If T1 is used, CSU/DSUs 43 and 49 operate in reverse with respect to one another in that CSU/DSU 49 is receiving and CSU/DSU 43 is transmitting when files are being forwarded from location 7 to location 9. After reaching CSU/DSU 49 at a particular headend 9, the files are forwarded to LAN-bridge 51, LAN 53, and NIC 55 to RS 47. LAN-bridge 51, LAN 53, NIC 55, and RS 47 are similar to their corresponding elements in distribution station 7 as is hard drive storage 57 at headend 9.

Figure 4:
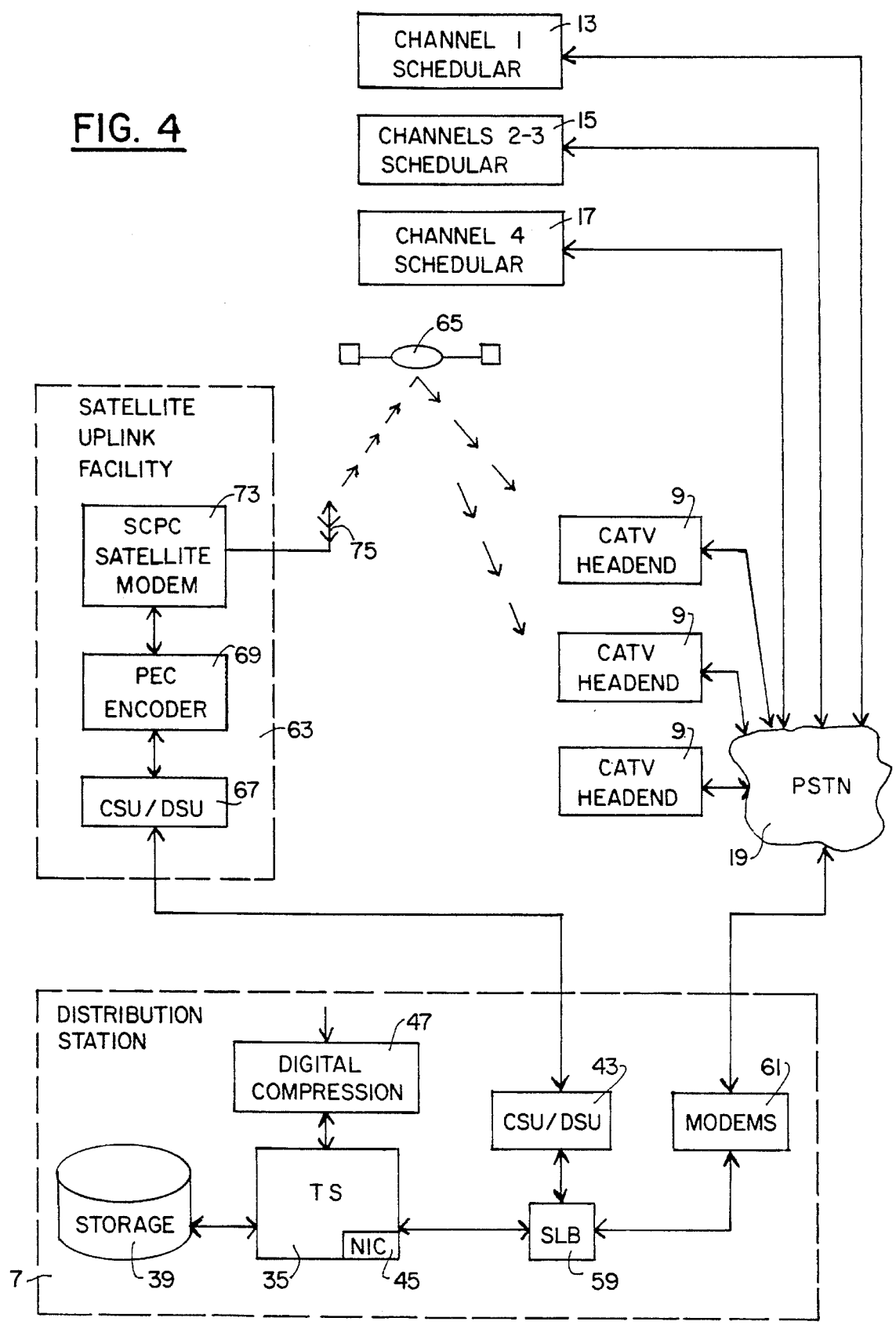
FIG. 4 is a block diagram illustrating a file transfer system via data packets from a distribution station to a plurality of headends according to an embodiment of this invention, the distribution station being enlarged so as to illustrate certain elements thereof.

FIG. 4 is a block diagram illustrating the video/audio file distribution system according to another embodiment of this invention, this embodiment differing from that of FIG. 3 in that files are transmitted from distribution station 7 to headend(s) 9 via satellite. TS 35, compression station 47, storage 39, and CSU/DSU 43 shown in FIG. 4 function in a similar manner to those of the previous embodiment of this invention. However, Smart LAN-bridge (SLB) 59 is provided at station 7 along with modem(s) 61 instead of LAN-bridge 41.

Distribution station transmits video/audio files in TCP/IP format to satellite uplink facility 63 where the packets are uplinked to satellite 65 and transmitted to headend(s) 9. Headend(s) 9 determine using TCP/IP whether the packets received via satellite 65 are in proper form or, alternatively, if they are in error and need to be re-transmitted from station 7. Headend(s) 9 may acknowledge (positively or negatively) the receipt of file packets and request re-transmission of those in error via PSTN link(s) or internet 19 interconnecting station 7 and headend(s) 9. Thus, while headend(s) 9 receive the video/audio data packets via satellite 65, they request re-transmission of packets in error via a land-link such as PSTN 19 so as to reduce the costly satellite transmission time required for the transfer of files.

Modem(s) 61 or other conventional data interface device(s) at station 7 receive such requests for re-transmission from headends 9 and forward such requests to SLB 59 which in turn accesses TS 35 which retrieves the data to be re-transmitted from storage 39. SLB 59 may be, for example, a PC type computer such as a Dell 486/66 EISA; an Ambra Pentium DP60/PCI; or an Ambra Pentium DP60 E/VL in certain embodiments of this invention. Such an SLB 59 is modified via hardware and software so as to be able to output packets to satellite uplink facility 63, receive requests for re-transmission from headends 9, interpret such requests, know when to retrieve data from storage 7, and decide (along with TS 35 in certain embodiments) whether to output such re-transmission via satellite 65 or land-link 19. SLB 59 is equipped with LAN-bridge software, an NIC, and other conventional additives which allow the SLB to perform the aforesaid functions.

With respect to the re-transmission from station 7 to headends 9 of packets originally received in error, SLB 59 makes the determination as to whether such re-transmissions will be via satellite 65 or land-link(s) 19. For example, if only one headend requests re-transmission of a particular packet, SLB 59 will re-transmit this packet via modem 61 and land-link 19 (e.g. PSTN) so as to avoid the need of tying up costly satellite transmission time for the re-transmission of a single packet to one headend. Alternatively, if ten different headends all request re-transmission of a sequential group of five packets, SLB 59 will generally re-transmit these five packets via satellite 65 so as to allow a single satellite transmission to satisfy all ten headends. SLB 59 makes these decisions based on economical and other pertinent considerations.

With respect to transmissions via satellite 65, once the TCP/IP data packets reach CSU/DSU 67 at satellite uplink facility 63 (e.g. IntelCom Group and Nova Net), the data packets are forwarded to optional FEC encoder 69. Encoder 69 adds Forward Error Correction (FEC) code to the data in certain embodiments, this FEC addition being conventional and well-known throughout the art. The addition of FEC data by encoder 69 to each packet will raise the overall bandwidth required for satellite transmission by a significant amount. An advantage of certain embodiments of this invention is the ability to either downsize or eliminate the FEC code added via encoder 69. Because TCP/IP (and sometimes the LAN protocol) includes error identification functionality, the satellite FEC data may be sacrificed. Therefore, encoder 69 and corresponding FEC error detector/corrector 71 (see FIG. 5) are optional.

The FEC encoded packets are then passed from encoder 69 to conventional SCPC satellite modem 73 which modulates the packets onto a carrier frequency and transmits them via transponder 75 to CATV headend(s) 9. Generally, the packets are uplinked to only a segment or a fraction of satellite transponder 75, although the entire transponder may be used in certain embodiments. Such a segmented or fractional use of transponder 75 is known in the art as Single Carrier Per Channel (SCPC) satellite transmission.

Figure 5:
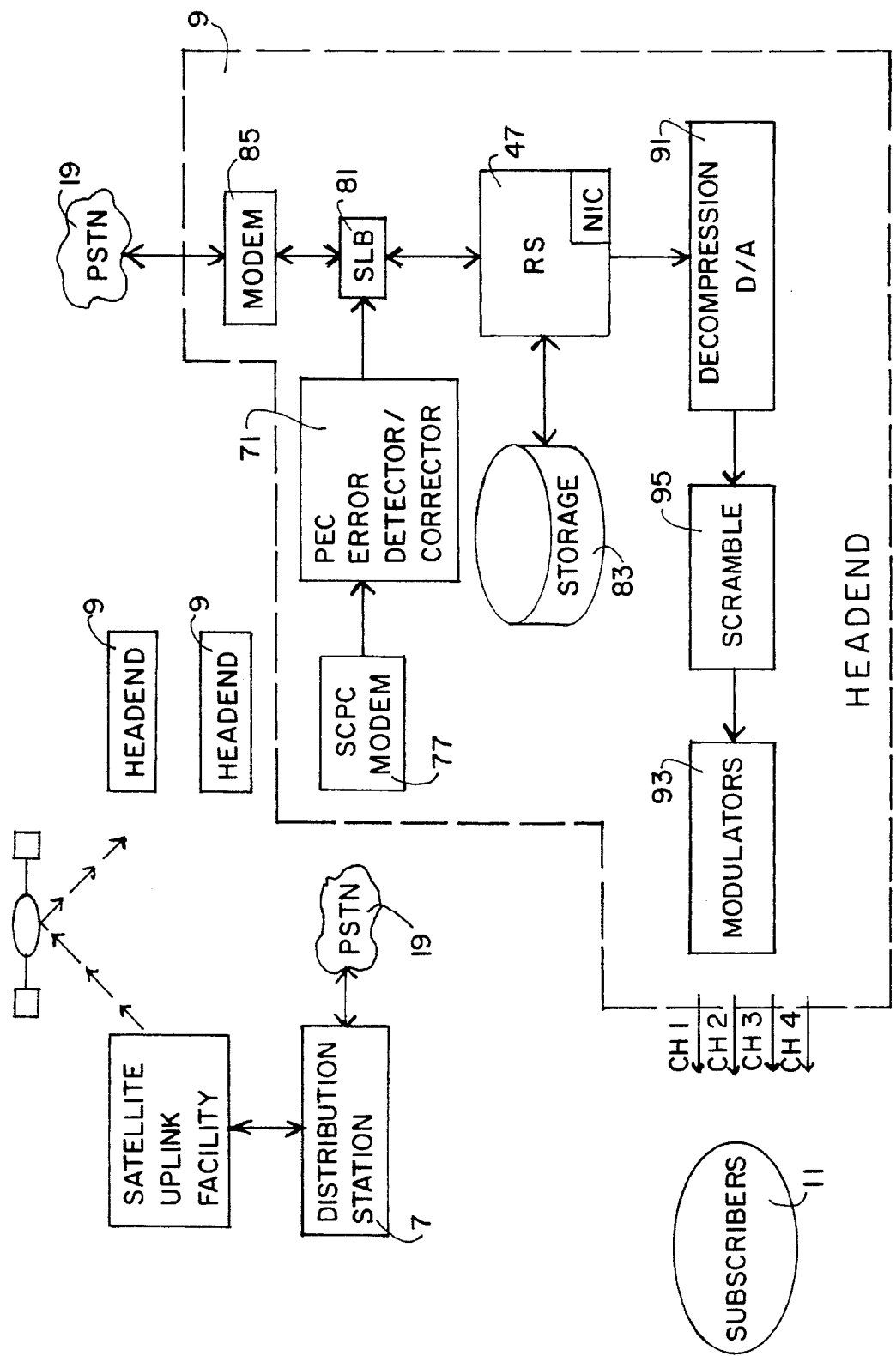
FIG. 5 is a block diagram illustrating the reception of data packets by a headend from a distribution station according to the FIG. 4 embodiment of this invention, one such headend in this figure being enlarged so as to show the different elements thereof.

In the FIG. 4 embodiment, each CATV headend 9 includes a conventional satellite dish (e.g. obtained from Scientific Atlanta) or antenna directed at transponder 75 thus allowing each headend 9 to receive the data packets which are then subsequentially passed from the respective satellite dishes to SCPC modem 77 at headend 9, FIG. 5 illustrating a headend 9 for receiving the satellite transmitted data packets of the FIG. 4 embodiment. SCPC satellite modems 73 and 77 in certain embodiments of this invention may be Digital Equipment Corporation DCC 4014A.

As shown in FIG. 5, SCPC modem 77 or other conventional data transfer device at headend 9 receives the data packets and thereafter demodulates the data stream before directing the packets to conventional Forward Error Correction (FEC) detector/corrector 71. FEC error detector/corrector 71 performs forward error correction (i.e. analyzes the data to identify those in error and corrects same) with respect to the FEC error data and at the same time removes the FEC data which was added by encoder 69. It is noted that RS 47 performs the TCP/IP error detection and acknowledgement process on each packet.

With respect to TCP/IP error detection at RS 47, reception is expected of the full file of data packets (e.g. packet numbers 1–100) as identified by TCP/IP. When RS 47 realizes that certain sequentially numbered packets are in error (i.e. were lost, missing, or not properly transmitted), RS 47 identifies such packets in error with respect to TCP/IP and/or LAN protocol in preparation for a request for re-transmission to be sent to distribution station 3.

RS 47 forwards all correctly received data packet to hard drive storage 83. RS 47 stores correctly received packets after discarding header/trailer overhead and sends data identifying those in error to SLB 81 and modem 85. Packets in error are identified to the distribution station via modem 85 and land-link 19 (e.g. PSTN or internet) so that station 7 may re-transmit (either via satellite or land-link) such packets.

With respect to data packets correctly received according to FEC, detector/corrector 71 and SLB 81 forwards them to Receiver Server (RS) 47 which stores the received packets in hard drive storage 83 after discarding header/trailer overhead.

Hard drive storage 83, RS 47, and SLB 81 are similar to their respective elements at station 7 shown in FIG. 4, RS 47 being similar to TS 35 and SLB 81 being similar to SLB 59.

After an entire video/audio file is correctly stored at 83 (or 57) by RS 47 at headend(s) 9, the file may be selectively retrieved by RS 47 from hard drive storage 83 (or 57) for distribution to subscribers 11 over a channel in accordance with playlist or scheduling data transmitted from one of schedulers 13, 15, and 17 to RS 47. RS 47 at headends 9 stores playlist and in accordance therewith retrieves files as necessary from hard drive 83 for a distribution over particular channels at particular times as dictated by the playlist. Upon retrieval from hard drive 83 (or 57), the selected file(s) are processed from RS 47 to decompression station 91. The video/audio data is both decompressed and switched from digital to analog at station 91 before being modulated by modulators 93 and sent over the cable television network via different channels to the plurality of subscribers 11, each channel having its own modulator in certain embodiments.

Optionally, each headend 9 may include scrambler device 95 in certain embodiments so as to scramble outgoing program data for the purpose of allowing only subscribers having enabling descramblers 23 to properly view such programs. Scrambler 95 may be disposed, in certain embodiments, between decompression station 91 and modulators 93.

While headend(s) 9 as shown in FIG. 5 outputs decompressed analog video/audio data via channels 1–4 to subscribers 11, the headend alternatively could output compressed video/audio data to subscribers 11 and each corresponding subscriber in such a case would be provided with a decompression station at his or her residence.

In a typical operation of the embodiment of this invention shown in FIGS. 1 and 3 with respect to channels 1–4 output by headend 9, operators at scheduling stations 13, 15, and 17 develop playlists or schedules for their particular channels. Thus, HBO's scheduler at location 13 develops a playlist for instructing headend 9 what movies and advertisements to play in what particular order. Likewise, a Cinemax operator at location 15 and a Preview operator at location 17 also develop such playlists or schedules.

After these playlists have been generated, they are transmitted via link(s) 19 to cable headend(s) 9. RS 47 at each headend(s) 9 receives the playlist from schedulers 13, 15, and 17, RS 47 storing such playlists at the headend in certain embodiments. While or after headend(s) 9 receives the playlists generated by schedulers 13, 15, and 17, the respective schedulers access distribution station 7 via communication link(s) 19 for the purpose of instructing station 7 to distribute certain video/audio files to headend 9. All video/audio programs identified on playlists transmitted from the schedulers to RS 47 at headend(s) 9 which headend(s) 9 do not have in storage are requested by schedulers 13, 15, and 17 to be transmitted from station 7 to headend(s) 9 via link(s) 19.

In accordance with instructions received from schedulers 13 and 15, TS 35 at distribution stations 7(*a*) may retrieve and transmit the needed files to headend(s) 9. With respect to channel 4 scheduler 17, it may station 7(*b*) (or station 7(*a*)), TS 35 of which retrieves identified files from storage 39 and transmits same via link(s) 19 to headends 9.

TS 35 of stations 7(a) and 7(b) upon retrieving needed files from hard drive 39, segments or divides each file into a plurality of data packets in accordance with conventional TCP/IP practice. After each file has been divided into such data packets, TS 35 accesses LAN 37 via NIC 45 so as to transmit the data packets via LAN 37 to LAN-bridge 41. LAN-bridge 41 in turn forwards the data packets to CSU/DSU 43 which accesses link 19 which is a conventional "T1" bi-directional link obtained from U.S. West in this embodiment (similar to conventional file transfer protocols (FTPs)). Accordingly, the data packets are forwarded from distribution stations 7(a) and 7(b) via T1 link(s) to CSU/DSU 49 at headend 9. Once reaching the headend, the data packets are forwarded to LAN-bridge 51, through LAN 53, and to RS 47. Alternatively, a plurality of receiver servers 47 may be provided at headend 9, each RS outputting a plurality of channels.

RS 47 at headend(s) 9 determines via conventional TCP/IP practice which data packets are in error and need to be re-transmitted from station 7(a) or 7(b). When such determinations have been made, the packets in error (i.e. missing or Jumbled) are identified via link 19 to the appropriate station 7(a) or 7(b). TS 35, upon receiving such a request for re-transmission, accesses the needed data from hard drive 39 and creates the missing TCP/IP packets. The packets needed for re-transmission are then forwarded via LAN 37 and bridge 41 to CSU/DSU 43 for re-transmission to headend(s) 9. In such a manner, headend(s) 9 eventually receives all packets of each file in correct form.

Thereafter, in accordance with the playlists stored by RS 47 at headend(s) 9, the particular files needed at certain times are retrieved from hard drive storage 57 for transmission via channels 1–4 to subscribers 11. For example, if the playlist generated by HBO's scheduler 13 and stored by RS 47 indicates that channel 1 is to play movie "A" at 3:00, then RS 47 before 3:00 retrieves movie "A" from storage 57 and readies it in a conventional manner for transmission via channel 1 to subscribers 11. Accordingly, at 3:00 movie "A" is transmitted via channel 1 from headend(s) 9 to subscribers 11.

Movie A on channel 1 along with the other programs on channels 2–4, etc. are received by particular subscribers 11 via converters 21. If a certain subscriber wishes to view movie "A" on HBO (i.e. channel 1) the subscriber simply selects channel 1 viewing via converter 21. Thereafter, if scrambler 23 at the particular subscriber's residence is enabled, it descrambles (if headend 9 originally scrambled the signal) movie "A" on channel 1 for transmission through recorder 27 to television receiver 29. Thus, the viewer may view movie "A" via receiver 29 at his residence.

As will be understood by those of skill in the art that, for example, when the HBO scheduler at location 13 wishes to modify the playlist such as by deleting a particular movie and inserting another, the scheduler does so at location 13 and the modified playlist is transmitted to headend 9 via link(s) 19. If headend 9 does not have in its storage the newly inserted movie, the operator or scheduler sofware at 13 will know this and will accordingly transmit a request via link(s) 19 to station 7 for a transmission from station 7 to headend 9 of this new movie recently added to the playlist.

The above-described and illustrated elements of the various embodiments of this invention are manufactured and connected to one another by conventional methods commonly used throughout the art.

Once given the above disclosure, therefore, various other modifications, features, or improvements will become apparent to the skilled artisan. Such other features, modifications, and improvements are thus considered a part of this invention, the scope of which is to be determined by the following claims.

We claim:

1. A cable television system with remote channel scheduling, the system comprising:

a cable headend including a headend server for outputting first and second CATV channels to a plurality of subscribers, said first and second CATV channels carrying different video/audio programs for distribution to said plurality of subscribers in accordance with predetermined playlist schedules, wherein each said subscriber has a receiver for allowing said subscriber to choose between one of said first and second channels for view;

a video/audio file distribution station having a transmitter server for transmitting digital video/audio files in non-real time to said cable headend, said cable headend subsequently storing said received files for later distribution to said plurality of subscribers;

a first and a second scheduling station for generating said playlist schedules for said first and second channels by way of controlling the content, order, and time that said video/audio programs are output to said subscribers over each of said first and second channels, said first scheduling station controlling the playlist schedule of said first channel and said second scheduling station controlling the playlist schedule of said second channel so as to allow the video/audio output of said first and second channels to be controlled separately; and computer means at each of said first and second scheduling stations for modifying said playlist schedules of said first and second channels respectively, said computer means also accessing said transmitter server at said file distribution station and requesting transmission of files listed on said playlist schedules from said distribution station to said cable headend whereby said headend is supplied with said files to be output via said first and second channels in accordance with said playlists generated by said first and second scheduling stations.

2. The cable television system of claim 1, wherein said first and second scheduling stations are each in communication with both said video/audio file distribution station and said cable headend so as to allow said first and second scheduling stations to access said headend for the purpose of providing scheduling information thereto and access said transmitter server at said distribution station for the purpose of instructing said transmitter server which video/audio files said headend lacks and needs transmitted thereto.

3. The system of claim 2, wherein said transmitter server at said distribution station transmits said video/audio files requested by said first and second scheduling stations to said cable headend via satellite communication and a server at said headend subsequently stores said files so as to eliminate redundant and/or repetitious file transmissions to said headend.

4. The system of claim 3, wherein a land-link interconnects said cable headend and said distribution station; and said headend includes error detection means for identifying packets of said files received from said distribution station which are in error and need to be re-transmitted to said headend from said distribution station.

5. The system of claim 4, wherein the headend requests re-transmission of said packets identified as being in error via said land-link interconnecting said headend and said distribution station, and said packets identified as being in error are re-transmitted from said distribution station to said cable headend by way of either said land-link or said satellite.

6. The system of claim 2, wherein said transmitter server at said distribution station transmits said digital video/audio files to said headend via a bi-directional land-link, and wherein said first and second scheduling stations communicate with both said distribution station and said headend via land-links.

7. The system of claim 1, further including a plurality of cable headends, each of said plurality of headends outputting said first and second channels and being in communication with said first and second scheduling stations so as to allow said scheduling stations to control the output of their respective channels at each of said plurality of headends; and wherein each of said first and second scheduling stations is in communication with said distribution station so as to allow said first and second scheduling stations to both control the playlists of said first and second channels via communication with said plurality of headends and control transmission of files from said distribution station to said plurality of headends in accordance with said playlists.

8. A method for controlling the playlist schedules of a first and a second video/audio channel output from a CATV headend, said method comprising the steps of:

a) generating a playlist schedule for said first channel at a first scheduling location, said first scheduling location including a first computer for generating and modifying said first channel playlist schedule;

b) generating a playlist schedule for said second channel at a second scheduling location, said second scheduling location including a second computer for generating and modifying said second channel playlist schedule thereby allowing the playlist schedules of said first and second channels to be generated, modified, and controlled from different locations;

c) supplying said headend from a first file distribution station digital video/audio files contained in said first and second channel playlists, said first and second computers at said first and second scheduling locations being in communication with said first file distribution station for instructing said distribution station to supply particular files to said headend;

d) outputting from said CATV headend video/audio programs over said first channel to a plurality of subscribers in accordance with said first channel playlist schedule generated in step a); and e) outputting from said CATV headend video/audio programs over said second channel to said plurality of subscribers in accordance with said second channel playlist schedule generated in step b).

9. The method of claim 8, further comprising the step of:

f) receiving said video/audio programs of said first and second channels at locations corresponding to each of said plurality of subscribers and at each such location selecting one of said first and second channels for viewing.

10. The method of claim 9, wherein said step c) includes said first computer at said first scheduling location accessing a first transmitter server at said first distribution station and instructing said first transmitter server to access and transmit in less than real time video/audio files or programs listed in said first channel playlist schedule to said cable headend, and said second computer at said second scheduling location accessing a second transmitter server at a second distribution location and instructing said second transmitter server to access and transmit in less than real time video/audio files listed in said second channel playlist schedule to said headend thereby allowing said headend to store said video/audio files to be later distributed via said first and second channels in accordance with said playlist schedules.

11. The method of claim 9, wherein said step c) includes said first and second computers at said first and second scheduling locations respectively accessing a first transmitter server at said first distribution station and requesting said transmitter server to access and transmit in less than real time video/audio files listed in said first and second channel playlist schedules to said cable headend thereby allowing said headend to store said files to be output at a later time via said first and second channels.

* * * * *